UNITED STATES PATENT OFFICE.

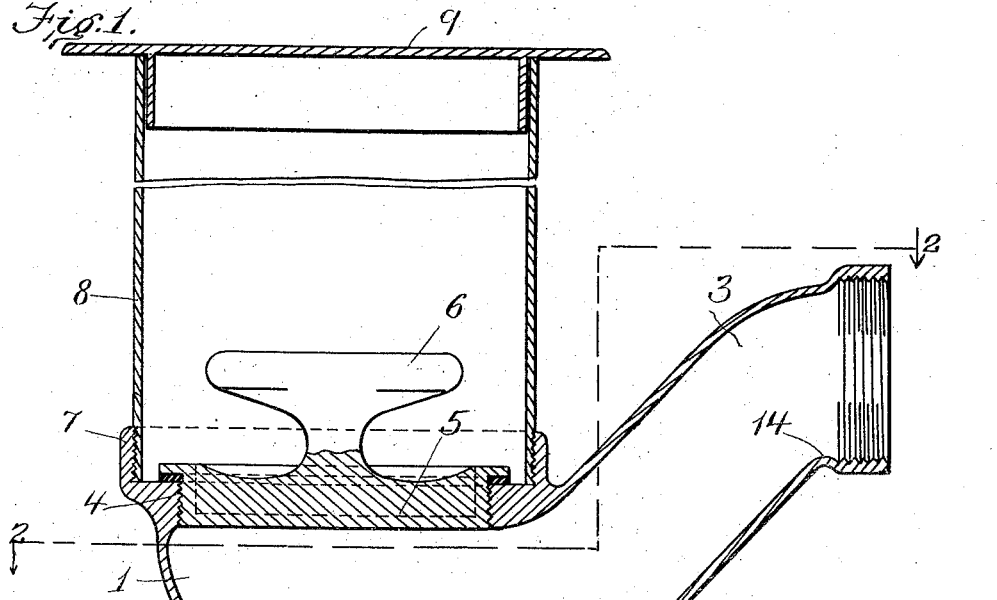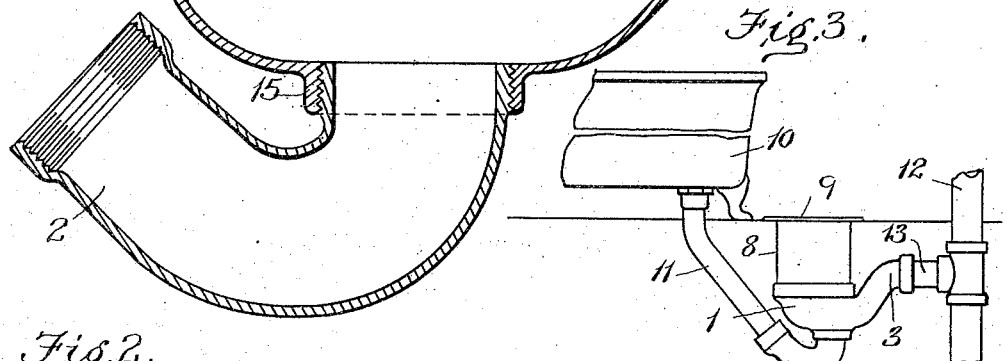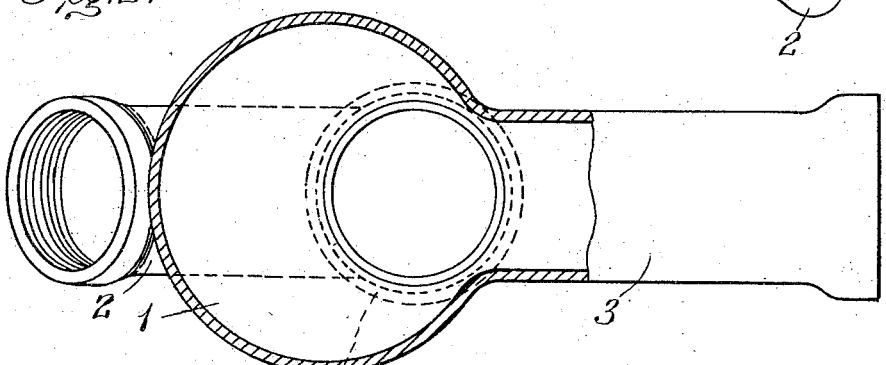

PETER F. LYONS, OF BOSTON, MASSACHUSETTS, ASSIGNOR OF ONE-HALF TO C. H. CRONIN, OF BOSTON, MASSACHUSETTS.

BATH-TRAP.

1,016,342.      Specification of Letters Patent.      Patented Feb. 6, 1912.

Application filed March 10, 1910. Serial No. 548,492.

*To all whom it may concern:*

Be it known that I, PETER F. LYONS, of Boston, in the county of Suffolk and State of Massachusetts, have invented certain new and useful Improvements in Bath-Traps, of which the following is a specification.

This invention relates to a trap adapted to be installed in plumbing systems and being especially designed for insertion in the outlet connections of bath tubs.

The object of the invention is to provide an adjustable trap which may be set in a relatively restricted space, and at the same time be properly connected both with the outlet of the tub and with the soil pipe.

Another object is to provide a trap of such construction that it cannot be emptied by siphonage, but, on the contrary, there will always be a water seal sufficient to prevent the backing up of sewer air through the trap.

Another object has been to provide a trap of such construction that it can be so opened as to permit cleaning out of the escape pipe easily in case of a stoppage of the pipe.

Still another object has been to construct the trap in such a manner that the screw which closes the opening in its top will be under water, and at the same time will afford no spaces in its under surface in which refuse may collect.

In carrying my invention into effect, I have provided a trap which is illustrated in its preferred form in the accompanying drawings, it being understood, however, that the same principles may be embodied in traps of other forms and designs.

In the drawings, Figure 1 is a vertical central section of a trap constructed in accordance with the present invention. Fig. 2 is a sectional plan view on the line 2—2 of Fig. 1. Fig. 3 is an elevation of the trap showing the manner in which the same is applied when in use.

The same reference characters indicate the same parts in all the figures.

The trap consists essentially of a casing 1 having an inlet 2 and an outlet 3. The casing 1 and outlet 3 are preferably in one piece and may conveniently be a single casting. The casing itself is circular in plan view, and the outlet extends from one side thereof. In the top of the trap body or casing is a clean-out opening 4, which is normally closed by a screw plug 5 having a handle 6. An internally threaded flange 7 rises from the upper wall of the trap body surrounding the opening 4 and into this flange or lip is screwed a cylinder or canister 8, which extends from the trap to the floor line of the building in which the trap is installed and has a removable cover 9.

The inlet 2 is connected with the bath tub 10, or other fixture, by means of a connecting pipe 11, while between the outlet and the rising pipe or soil pipe 12 is a connection 13, which has sufficient downward slant in extending between the outlet and soil pipe to cause the water to run freely into the latter.

The outlet 3 extends on an upward slant from the top of the trap to such an extent that the lower side of its outlet orifice at 14 is higher than the opening 4. The point 14 determines the minimum water level in the trap and this level is consequently above the opening 4 in the top of the trap. Consequently if the covering plug 5 should be accidentally left off after the trap has been cleaned, it is still sealed by the water in the trap, and escape of sewer air is prevented. It will be noted further that the level of the point 14 is also below the upper edge of the flange 7. This enables the water in the trap to be contained, even though the canister 8 should be removed, for cleaning or any other purpose, before the water in the trap has been bailed out.

One of the important features of this invention is the angular adjustability of the inlet, and for this purpose the inlet pipe 2 is connected with the under side of the trap by means of a threaded nipple 15, the axis of which is vertical. The threads of the inlet pipe and the nipple fit closely, but there is no shoulder on either preventing rotation of the inlet, and as a consequence the latter may be swung around to any angle relatively to the outlet. As a result of this construction the trap may be set up as shown in the drawings, with the inlet on the diametrically opposite side of the trap from the outlet, or it may be placed on the same side as the outlet, or in any intermediate position on any side of the trap. This feature of adjustability enables connection from the trap to the tub or other fixture to be made, even though the trap is not directly between the fixture and the soil pipe, and permits the trap to be placed in spaces so confined that other traps lacking this adjustability could not be used. That is, my trap can be put in any space where there is room for the body of the trap, regardless of the inlet connection, and the latter may be adjusted at any angle, and the pipe from the fixture outlet to this inlet arranged to accommodate this adjustment. The dimensions of the trap are such as to permit of its being placed in a comparatively small space, and its adjustability enables proper connection to be made with it, whatever its position with respect to the fixture may be.

It will be noted from Figs. 1 and 2, particularly the latter, that the diameter of the trap body is considerably larger than the diameter of the inlet, and that the discharge opening of the inlet is located between the outlet and the center of the trap. As the result of this construction and arrangement the trap body is enabled to contain a relatively large volume of water outside of the most direct passage between the inlet and outlet, and as a result there is no siphonic action, or, in other words, the siphonage is broken before all of the water is drawn from the trap and while enough remains in the body of the trap to flow back and seal the inlet connection therein.

As appears from Figs. 1 and 3, there is a practically direct passage between the inlet 2 and outlet 3, while the body of the trap forms a reservoir offset from this passage and having its greatest volume at one side thereof. When the water is allowed to run out of the tub 10 the trap and connections thereto are, of course, filled with water, and the siphonage would tend to draw all the water from the inlet 2. However, it is not sufficient to withdraw the water from the reservoir which is formed by the portion of the trap body at the side of the direct escape passage, on account of the fact that air will enter through the inlet pipe and break the siphonic seal before the water in the reservoir portion of the trap can be drawn out, and this water, as soon as the siphonic seal is broken, is sufficient in volume to fill the inlet pipe to a depth at least great enough to seal the same. As the inlet pipe 2 is made with a sharp bend, a comparatively small amount of water is sufficient to seal it, and the horizontal dimensions of the trap are made great enough outside of the pipe passage to retain at least a sufficient quantity of water for this purpose, when the siphon is broken. This feature is of importance when the trap is located in such places that there is a suction at the outlet sufficient to draw air in through the inlet, but in other cases where the escape pipes, corresponding to the pipe 12, are sufficiently open to permit return of air therethrough, the siphonage will stop as soon as the water level in the pipe 11 is as low as the point 14, and the entire trap and connections will then be filled to the height of the point 14.

Another important advantage which is derived from the trap constructed as herein shown, is in the capability for easy cleaning. The opening 4, which is ordinarily closed by the plug 5, is large and is only slightly below the discharge end of the outlet pipe. Hence in case the outlet is clogged by solid bodies lodging in any part of the same, or the connection 13, it is a simple matter to remove the can 8 and the plug 5 and to push a rod or brush through the outlet. This is an important advantage over other traps which are so constructed that a sufficiently rigid cleaning instrument to force out an obstinate obstruction cannot be inserted. With my construction of trap, when the can 8 and plug 5 are removed, the passage into the outlet connection from the outside is sufficiently large and so nearly straight as to permit a rod having sufficient stiffness to force out any ordinary obstruction, to be inserted.

The plug 5, as appears from Fig. 1, is smooth on its under surface, and is so proportioned that when screwed tightly home, its under surface is flush with the interior of the top of the trap. Thus no parts are left in which scum and dirt may collect, but the plug, as well as the entire interior surface of the trap, is subjected to the scouring action of the escaping water and all interior surfaces are kept clean and sanitary. As the opening 4 of the trap is below the point 14, and therefore below the normal water level in the trap, a seal is provided, even if the plug 5 is left off, and thus the trap is still effective, even though, owing to carelessness or oversight, the plug should not be replaced after having been removed for any purpose.

I claim,—

1. A bath trap comprising a generally circular or bowl-shaped shallow body having an outlet pipe at one side, the diameter of which is substantially as great as the depth of the body, and an inlet pipe curved to form a downward sealing loop connected to the bottom wall of the trap between the outlet and the center thereof, whereby the parts of the trap more remote from the inlet are enabled to form a reservoir withholding a quantity of water sufficient to refill the sealing loop when the latter is emptied by siphonage, without requiring valve means.

2. A trap consisting of a body having an outlet at one side and being substantially equal in depth to the width of the outlet, said body having an opening in its bottom extending from the side in which the outlet is located toward the center, and being of less diameter than the width of the body, an internally threaded lip projecting downward from the bottom of the body around such opening, and a U-shaped inlet pipe having on one end a projecting external thread screwed into said lip, said inlet pipe and body being free from abutments, whereby the inlet may be turned swivelly with respect to the body.

3. A trap comprising a shallow body portion having an opening in its top wall of nearly as great diameter as the width of the body, and a flange surrounding the opening, a plug detachably contained in the opening having a smooth under surface flush with the top inner surface of the trap, an outlet at the side of the trap rising to a height above the bottom of the plug and below the top of the flange, whereby the plug is scoured by the water flowing through the trap and can be removed to permit insertion of a cleaning instrument without causing the trap to overflow, and the flange being sufficiently low to enable such cleaning instrument to be pushed into the outlet.

4. A trap comprising a shallow body having an opening in its top wall of nearly as great diameter as the width of the body, and having a flange surrounding the opening, a plug detachably contained in the opening, an inlet opening into the bottom of the trap, an outlet at the side of the trap rising to a height above the bottom of the plug and below the top of the flange, and a can detachably screwed into said flange surrounding the plug and having a removable cover at its upper end.

In testimony whereof I have affixed my signature, in presence of two witnesses.

PETER F. LYONS.

Witnesses:
ARTHUR P. WILSON,
JOSEPH E. DONOVAN.

---

Copies of this patent may be obtained for five cents each, by addressing the "Commissioner of Patents, Washington, D. C."